United States Patent [19]
Trautmann

[11] Patent Number: 5,896,794
[45] Date of Patent: Apr. 27, 1999

[54] MACHINE TOOL

[75] Inventor: Guenther Heinrich Trautmann, Kirchheim-Nabern, Germany

[73] Assignee: Index-Werke GmbH & Co. KG Hahn & Tessky, Esslingen, Germany

[21] Appl. No.: 08/869,503

[22] Filed: Jun. 5, 1997

[30] Foreign Application Priority Data

Jun. 5, 1996 [DE] Germany .......................... 196 22 475

[51] Int. Cl.$^6$ ...................................... B23B 9/04
[52] U.S. Cl. .................. 82/129; 82/126; 82/127
[58] Field of Search ............................. 82/129, 123, 124, 82/126, 127

[56] References Cited

U.S. PATENT DOCUMENTS

| | | |
|---|---|---|
| 2,668,557 | 2/1954 | Hoelscher . |
| 2,892,388 | 6/1959 | Daugherty . |
| 4,100,825 | 7/1978 | McConnell et al. ...................... 82/129 |
| 4,158,319 | 6/1979 | Blockley et al. .......................... 82/129 |
| 4,185,366 | 1/1980 | Gilbert .................................. 82/129 X |
| 4,640,158 | 2/1987 | Link et al. ................................. 82/129 |
| 5,062,330 | 11/1991 | Trautmann et al. ................... 82/129 X |

FOREIGN PATENT DOCUMENTS

| | | |
|---|---|---|
| 0 096 091 A1 | 12/1983 | European Pat. Off. . |
| 0 249 845 A1 | 12/1987 | European Pat. Off. . |
| 0 342 045 | 11/1989 | European Pat. Off. . |
| 30 25 638 C2 | 1/1982 | Germany . |
| 34 28 861 A1 | 2/1985 | Germany . |
| 40 38 660 A1 | 6/1992 | Germany . |

*Primary Examiner*—Andrea L. Pitts
*Assistant Examiner*—Henry W. H. Tsai
*Attorney, Agent, or Firm*—Barry R. Lipsitz; Ralph F. Hoppin

[57] ABSTRACT

In order to improve a machine tool comprising a machine frame, a drum arranged on the machine frame for rotation about a drum axis and having a plurality of machining devices for tools held on it and drives associated with the machining devices and rotatable with the drum, a stationary control and supply unit for the drives and a line system connected, on the one hand, to the drives rotatable with the drum and, on the other hand, to the control and supply unit, this line system being free from interruptions and rotary connections and deformable as a result of rotation of the spindle drum, such that the line system can be guided in as space-saving a manner as possible it is suggested that the line system have a long line system section extending along a system axis and rotatable about the system axis.

22 Claims, 3 Drawing Sheets

MACHINE TOOL

BACKGROUND OF THE INVENTION

The invention relates to a machine tool comprising a machine frame, a drum arranged on the machine frame for rotation about a drum axis and having a plurality of machining devices for workpieces held on it and drives associated with the machining devices and rotatable with the drum, a stationary control and supply unit for the drives and a line system connected, on the one hand, to the drives rotatable with the drum and, on the other hand, to the control and supply unit, this line system being free from interruptions and rotary connections and deformable as a result of rotation of the spindle drum.

In a machine tool of this type, the line system is, for example, during rotation of the drum likewise wound onto or off a drum. This solution has the disadvantage that it requires considerable constructional space in a radial direction in relation to the drum axis and thus, in many cases, acts as an interference in the case of auxiliary devices attached to the machine tool.

SUMMARY OF THE INVENTION

The object underlying the invention is therefore to improve a machine tool of the generic type such that the line system can be guided in as space-saving a manner as possible.

This object is accomplished in accordance with the invention, in a machine tool of the type described at the outset, in that the line system has a long line system section extending along a system axis and rotatable about the system axis.

With this inventive solution, a particularly space-saving guidance of that part of the line system going with the rotary movement of the drum relative to the machine frame is created since the line system with its long line system section requires little space and, in particular, requires very little space radial to the drum axis.

These spatial requirements have a particularly advantageous effect on the space for movements of machining devices movable relative to the drum in the direction of the drum axis since, in the case of the inventive solution, the long line system section can be arranged around the drum axis within a cylindrical space which is not touched during movement of the machining devices along the drum axis.

The long line system section could, in principle, be rotatable in any optional form. In this respect, it is particularly advantageous when the long line system section is designed to be rotatable exclusively about the system axis since a long line system section tolerates such a rotation with the slightest material load in an optimum manner.

The line system section could, in principle, not only be designed to be extended but also comprise coiled lines or be constructed exclusively of such lines so that a rotation of the long line system section would lead to a twisting and untwisting of the coil.

Such an additional coiling of the individual lines of the line system section does, however, have the disadvantage that the entire, extended line section is again of a larger construction in a radial direction in relation to the system axis, or that it must be accepted that the individual lines in this long line section possibly touch one another and thus manifestations of wear and tear occur during the course of time as a result of this touching.

For this reason, a particularly advantageous embodiment provides for the line system section to have long lines extending essentially parallel to one another in a non-rotated basic position. In this case, the lines can be arranged particularly advantageously with as small a cross section as possible of the entire line system in a radial direction, wherein any mutual touching of the individual lines is essentially avoided.

In this case, any twisting of the long line section leads to the individual lines extending like a coil around the system axis in a not very distinctive form.

In order to keep the twisting as slight as possible and thus keep the entire length of the long line system section likewise as small as possible, it is advantageously provided for the line system section to be rotatable through a maximum of 180° in opposite directions proceeding from its non-rotated basic position. This solution makes it possible to carry out, in principle, an entire rotation of up to 360° with a spindle drum and thus to work through a machining cycle corresponding to a rotation of the drum through up to 360°, not, however, to then rotate through more than 360° but, by rotating quickly back to the initial position, to carry out the next machining cycle again as a result of rotation through up to 360°.

In the case of eight machining devices arranged at the same angular distances, the maximum angle is, in the simplest case, only 315°, with six machining devices only 300°.

Rotary movements through ±180° may, however, already be realized satisfactorily with relatively short and highly flexible lines, wherein a length of the long line section of approximately 2 m, preferably in the order of magnitude of 1m, fulfills the set requirements.

The long line system section could, in principle, be rotatable in any optional form. It is, in this respect, particularly advantageous when the long line system section is designed to be rotatable exclusively about the system axis since a long line system section tolerates such a rotation with the slightest material load in an optimum manner.

The system axis could, in principle, extend at an angle to the drum axis. In this case, however, additional sections are provided outside the long line system section and the individual lines of the line system are guided in these additional sections such that they compensate for any additional movement which would be caused by a system axis deviating from parallelism in relation to the drum axis.

For this reason, it is even preferably provided for the system axis to extend coaxially to the drum axis.

The inventive solution can, for example, be realized such that the long line system section already extends within the drum.

In order to have sufficient space for the guidance of the line system section, particularly when a great length of this section is required, it is particularly advantageous when the long line system section extends in the direction away from the working space, preferably on a side of the drum located opposite the working space, since, in this case, no hindrance whatsoever of the workpiece machining takes place in the working space as a result of the long line system section.

If, for example, a stock supply is provided on the side of the drum facing away from the working space, the long line system section is preferably arranged such that this extends through the stock supply for the drum.

Alternatively thereto, it is provided in a different solution, in which no stock supply is present, for the long line system section to extend along the control and supply unit.

In order to guide the long line system section in a defined manner, it is provided for this to be held extended on a system guide means which has an end holding means rotating with the drum and an end holding means non-rotatable about the system axis. With this type of guidance for the line system section, a high reliability during continuous operation is ensured, in particular, since the lines are subject only to the deformations absolutely necessary on account of the rotation of the line system section but not to any additional deformations.

In order to be able to compensate in a particularly simple manner for any shortening in the length of the long line system section occurring on account of its twisting, it is provided for the end holding means to be movable relative to one another with respect to their spacing in the direction of the system axis.

In the simplest case, it is provided for one of the end holding means to be arranged to be stationary in the direction of the system axis while the other end holding means is arranged to be movable in the direction of the system axis. It is, however, also possible to arrange both end holding means so as to be movable in the direction of the system axis.

In order to be able to compensate for the alterations in length of the long line system section during rotation thereof about the system axis in view of connections connected to the drives or connected to the control and supply unit, it is preferably provided for a line section to adjoin the long line system section which compensates for any longitudinal movement of its end in the direction of the system axis. Such a line section which is provided specifically for length adjustment has the advantage that this allows a compensation of the alterations in length of the long line system section which is completely independent of the rotation.

Such a length-adjusting line system section may be designed particularly expediently when the individual lines have a bent shape which can be varied as a result of the longitudinal movement of the end in the direction of the system axis. As a result of a shape of the individual lines bent in this manner, relatively large longitudinal movements can be compensated in a simple manner without considerable wear and tear on the lines themselves.

In this respect, it is particularly expedient when the bent shape of the lines is a U shape.

Particularly large longitudinal movements in the direction of the system axis may be compensated when the arms of the U shape extend approximately parallel to the system axis since, in this case, a parallel displacement of the arms of the U relative to one another takes place but the bend of the U does not essentially alter its shape and thus the line forming the U shape extends either in a straight line or in the bend of the U and so the load on the line is kept as low as possible by this.

In the case of a plurality of lines, especially lines leading directly to individual machining devices, it is preferably provided for the U shape to be located in a plane extending through the system axis so that the individual lines guided in a U shape may be arranged around the system axis in planes which form a family of planes defined by the system axis.

In conjunction with the embodiments described thus far, it has merely been assumed that the long line system section is arranged between two end holding means. In order to prevent, in addition, any touching of the individual lines during the course of the long line system section and to guide these always in a defined manner relative to one another, it is provided for intermediate holding means to be arranged between the end holding means, these intermediate holding means positioning the individual lines, in particular, relative to one another in the same way as the two end holding means.

In order to prevent, in addition, any sagging of the lines between the end holding means, it is advantageously provided for the intermediate holding means to be rotatably arranged on a support of the system guide means.

The entire course of the individual lines in the long line system section can be determined particularly advantageously by means of such a support for the intermediate holding means.

In order to ensure, in addition, that the individual lines of the long line system section are not subject to any restraints whatsoever between the end holding means, it is preferably provided for the intermediate holding means to be mounted on the support so as to be movable in the direction of the system axis and rotatable about this axis so that the required rotation can occur automatically between the end holding means at any point of the long line system section, wherein a constant twisting will normally occur advantageously over the entire length of the long line system section.

In this respect, the support can be designed in the most varied of ways. For example, it would be conceivable to provide a support solely for the intermediate holding means. It is, however, particularly advantageous when the support bears at least one of the end holding means and the intermediate holding means. The support can thus be rigidly connected either to the non-rotatable end holding means or to the rotatable end holding means while the intermediate holding means ought to be rotatable, in any case, relative to the support and displaceable in the direction of the system axis.

In the simplest case, it is provided for the support to be designed as a support tube. Such a support tube ensures in a simple manner a simple rotary guidance for the intermediate holding means on all sides.

The support can be an independent part; in the case of a stock supply it is, however, advantageously provided for the support to have guide means for the stock.

In this respect, it is particularly expedient when the support has guide means for the stock arranged coaxially to the individual machining devices, wherein the stock is, in the simplest case, bars of stock.

In this case, it is advantageously provided for the support to be non-rotatably connected to the drum so that the guide means for the stock can also rotate with the drum at the same time.

With respect to the design of the machining devices, no further details have been given in conjunction with the preceding explanations of the inventive solution. One advantageous variation, for example, provides for one of the machining devices to be designed as a spindle rotatingly drivable by a drive.

Spindles of this type are preferably designed as workpiece spindles so that a rotary machining of a workpiece takes place with these spindles.

Alternatively thereto, it is, however, also conceivable for the spindles of the machining devices to be so-called tool spindles, i.e. accommodate a rotating tool.

Alternatively or in addition to the design of the machining devices as spindles, it is likewise provided within the scope of the inventive solution for one of the machining devices to have a clamping device actuatable by a drive. This means that, in this case, the clamping device, whether for the workpiece or the tool, can be activated by the control and supply unit, wherein an activation of the drive provided for this purpose, which can be designed, for example, as a cocking cylinder, takes place.

Alternatively or in addition to the solutions described above, it is likewise conceivable within the scope of the inventive solution for one of the machining devices to be displaceable relative to the drum parallel to the guide means of the drum axis. This applies, in particular, for machining devices designed like spindle sleeves. Machining devices of this type can be workpiece spindles, tool spindles or also workpiece receiving means or workpiece guide means which interact with a workpiece spindle.

All these types of machining devices and also machining possibilities are described, for example, in German patent applications 195 04 371.5 or 195 04 370.7.

Additional features and advantages of the invention are the subject matter of the following description as well as the drawings illustrating one embodiment.

DETAILED DESCRIPTION OF THE INVENTION

Figure 1:
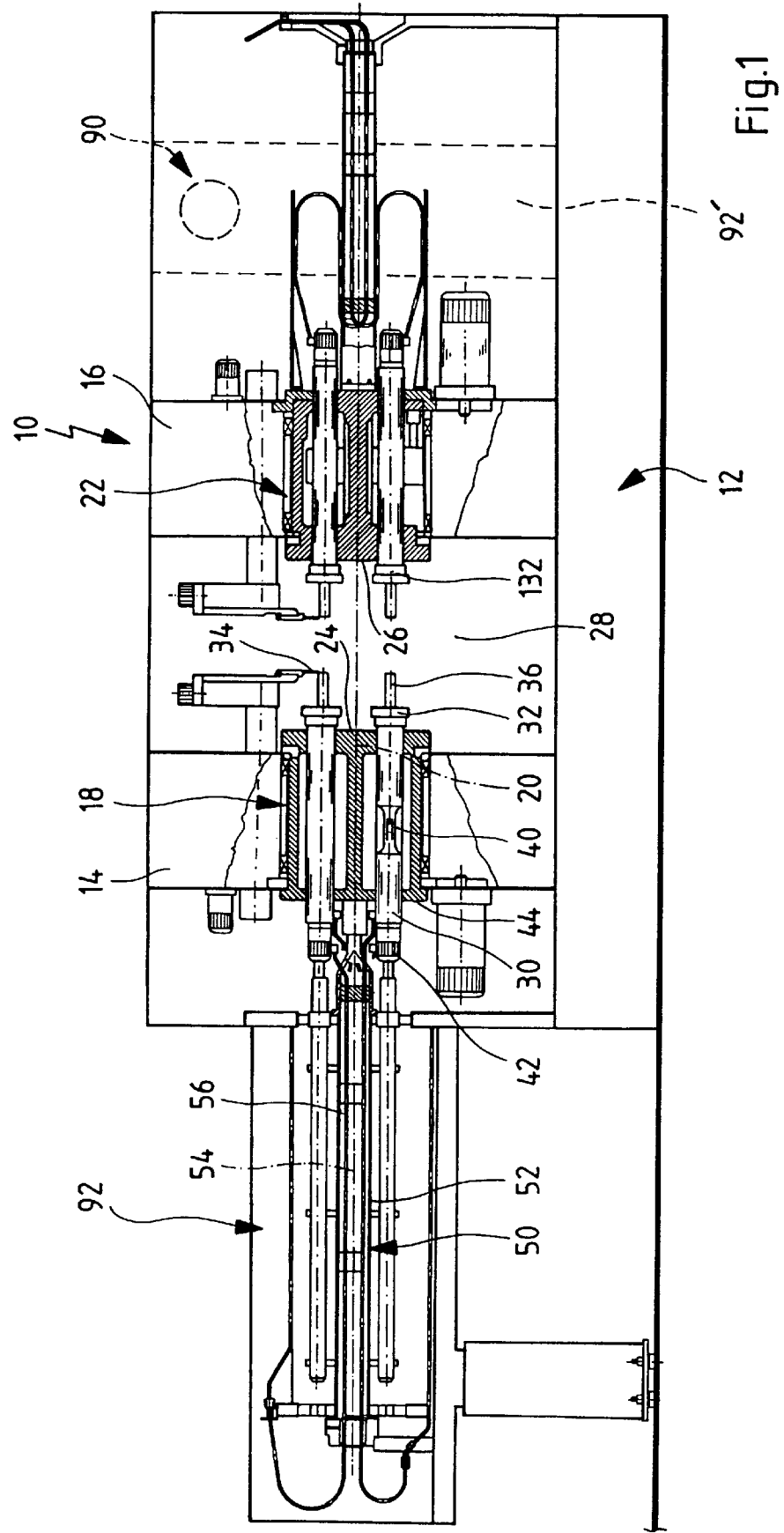
FIG. 1 shows a longitudinal section through an inventive multiple spindle lathe.
Figure 2:
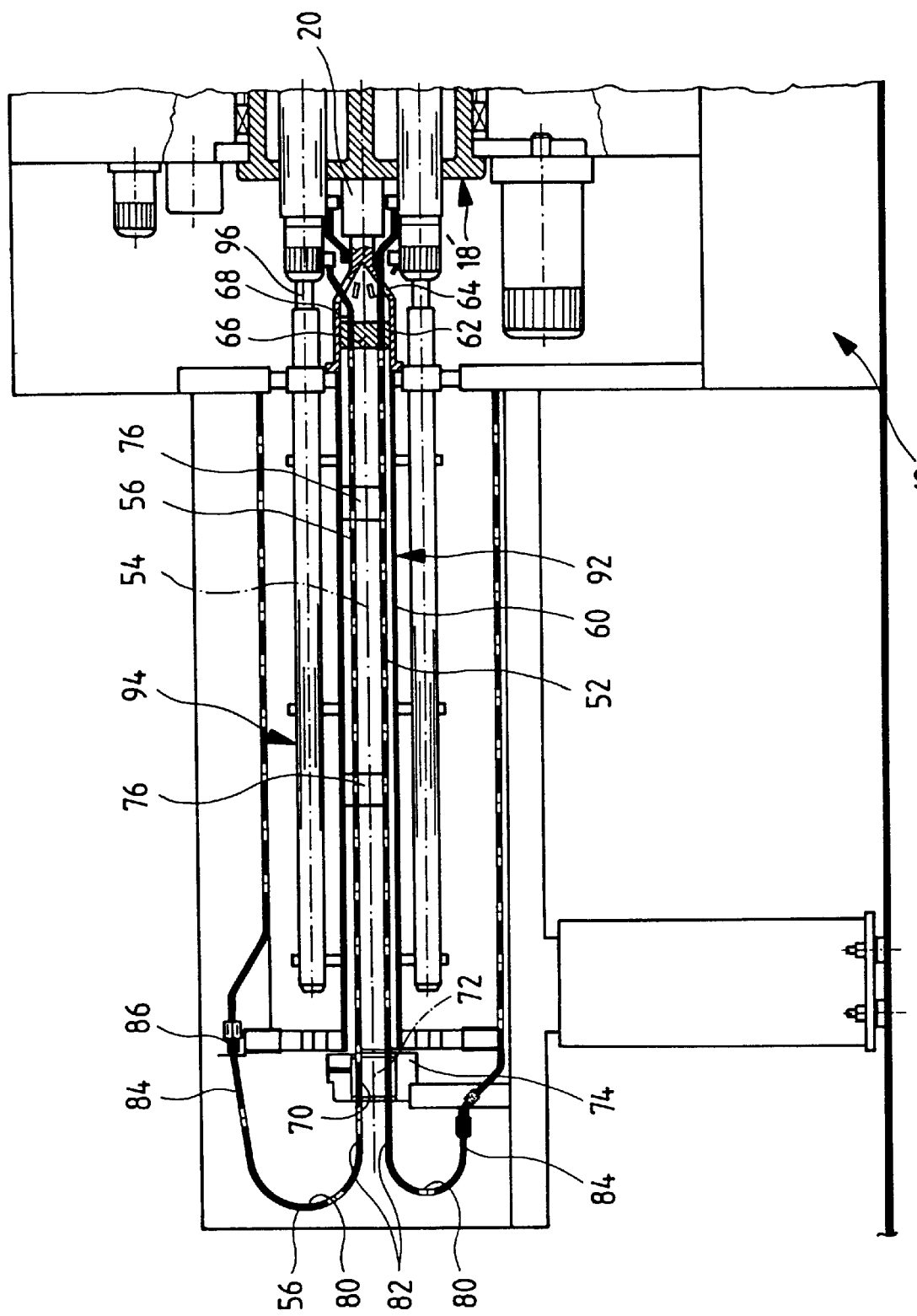
FIG. 2 shows an enlarged illustration of the left side of the longitudinal section in FIG. 1
Figure 3:
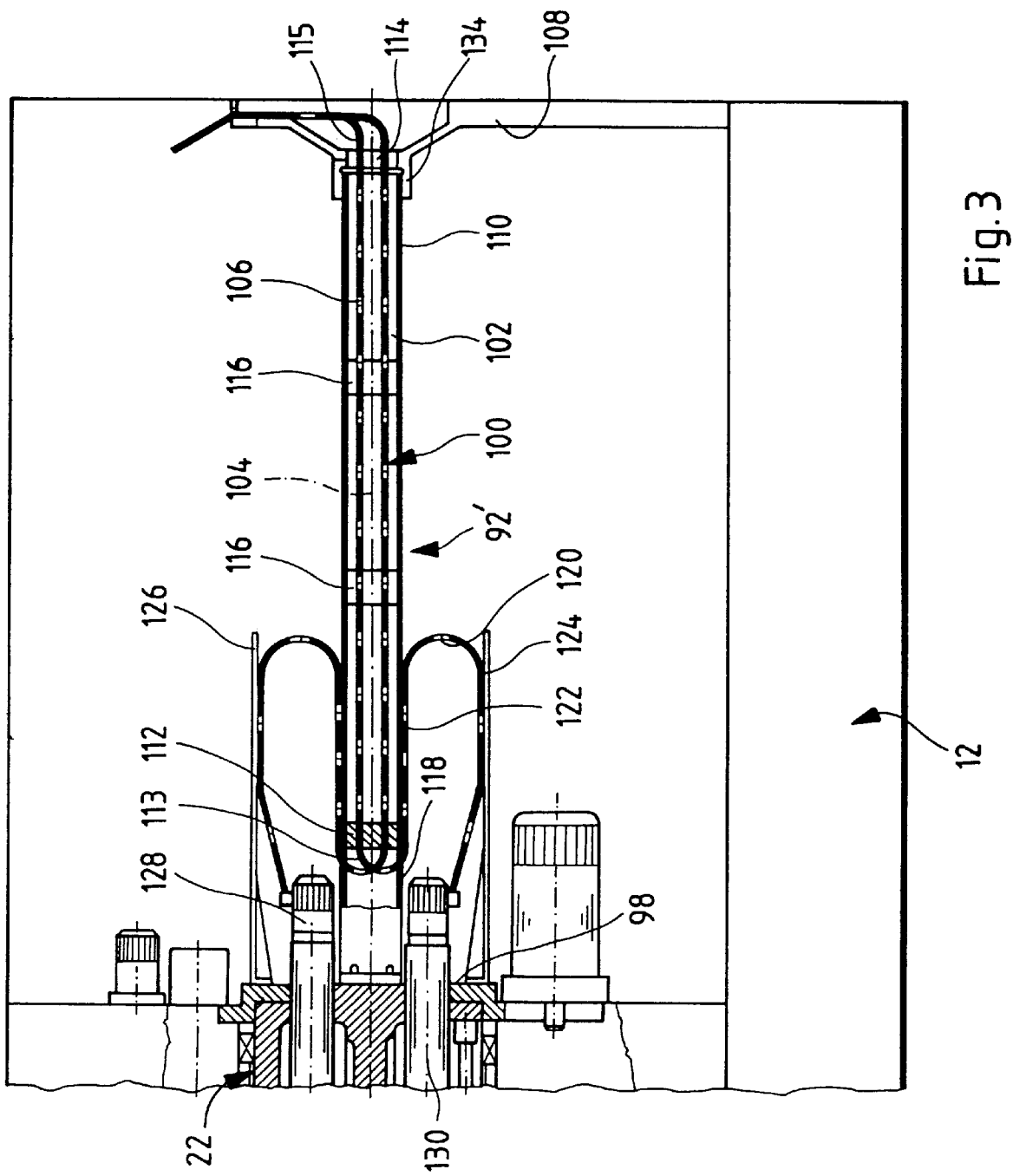
FIG. 3 shows an enlarged illustration of the right side of the longitudinal section in FIG. 1.

One embodiment for an inventive machine tool is a multiple spindle lathe which is illustrated in FIGS. 1 to 3 and designated as a whole as 10 and which has a machine frame 12 with a headstock 14 as well as a counterheadstock 16, wherein a spindle drum designated as a whole as 18 is mounted in the headstock 14 for rotation about a spindle axis 20.

In the same way, a counterspindle drum designated as a whole as 22 is likewise arranged in the counterheadstock 16 for rotation about the spindle axis 20.

Not only the spindle drum 18 but also the counterspindle drum 22 are arranged with their front sides facing a working space designated as 28.

The spindle drum 18 bears a plurality of machining devices, in this case workpiece spindles 30 in the form of cylinders or spindle sleeves, preferably six or eight, which are arranged at the same angular distances around the drum axis 20 and bear on a side facing the working space 28 a clamping device 32, for example a chuck, for workpieces 36 to be machined in the working space 28 with tools 34.

In order to be able to rotatingly drive the workpiece spindles 30, each of them is provided with a spindle motor 40 associated exclusively with it as a drive means which can be integrated into the respective workpiece spindle 30 or attached separately.

Furthermore, each of the workpiece spindles 30 is provided with a cocking cylinder 42 actuating the respective clamping device 32 as a drive means.

To supply and control the drives, i.e. the spindle motors 40 and the cocking cylinders 42 as well as, where applicable, additional drives or sensors, a line system 50 is provided which proceeds from a rear side 44 of the spindle drum 18 located opposite the front side 24 and extends with a long line system section 52 along a system axis 54 which runs parallel to the drum axis 20.

The line system 50 comprises, at least in its long line system section 52, a plurality of lines 56 which extend parallel to one another and are arranged preferably symmetrically to the system axis 54 and around this.

These lines 56 can be any type of supply lines, for example, pressures lines, in particular oil pressure lines, and/or electrical leads.

The long line section 52 preferably extends in a support tube 60 which is arranged coaxially to the system axis 54 and non-rotatably connected to the spindle drum 18.

The support tube 60 has for this purpose at its end 62 facing the spindle drum 18 radial passages 64, through which the lines 56 leading to the individual drives 40, 42 are guided out of the support tube 60. The lines 56 guided through the passages 64 in the support tube 60 are held in this support tube 60 in the region of the end 62 by an end holding means 66, wherein the end holding means 66 is non-rotatably connected to the support tube 60 and thus to the spindle drum 18. The end holding means 66 is, in addition, fixed in position in the support tube 60 so as to be non-displaceable in the direction of the drum axis 20.

The end holding means 66 preferably guides all the lines 56 of the long line system section 52 at defined distances from one another at its end 68 on the side of the spindle drum.

At the end 70 of the long line system section 52 located opposite the end 68 and facing away from the spindle drum, this is likewise held in an end holding means 72 which is nonrotatably arranged in relation to the machine frame 12 but is guided in a receiving means 74 so as to be displaceable longitudinally in the direction of the system axis 54. The long line system section 52 extends between the two ends 68 and 70 with long, individual lines 56 arranged essentially around the system axis 54, wherein the lines 56 extend parallel to one another and essentially parallel to the system axis 54 in a basic position of the long line system section 52.

Proceeding from the basic position of the long line system section 52 illustrated in FIG. 2, this can be rotated through up to 180° in directions of rotation opposite to one another as a result of rotation of the spindle drum 18, wherein the end holding means 66 rotates with the spindle drum 18 while the end holding means 72 remains non-rotatable relative to the machine frame. The long line system section 52 thus twists as a whole, wherein the individual lines 56 then extend around the system axis 54 in a slightly helical manner at maximum rotation.

In order to guide the lines 56 in a defined manner between the ends 68 and 70 of the long line system section 52, intermediate holdings means 76 are provided in the support tube 60 at distances from one another and these are freely rotatable about the system axis 54 and displaceable relative to the support tube 60 in the direction of the system axis 54, wherein the intermediate holding means 76 serve to position the lines 56 relative to one another in the same way as the end holding means 66 and 72.

During the rotation of the long line system section 52 about the system axis 54 as twisting axis and the slight, helical-like course of the lines 56 caused by this, the long line system section 52 is reduced in length between the ends 68 and 70, wherein this shortening in length can be compensated by the end holding means 72 movable in the direction of the system axis 54. Since, in addition, the intermediate holding means 76 are likewise movable in the direction of the system axis 54 but are, furthermore, freely rotatable relative to the support tube 60, a uniform twisting of the lines 56 about the system axis 54 as twisting axis can occur between the ends 68 and 70 of the long line system section 52.

In order to design the line system 50 following the end holding means 72 displaceable along the system axis 54 such that this can be guided further in a manner stationary with respect to the machine frame but can still compensate for the movement of the end holding means 72 along the system axis 54, the individual lines 56 are guided in U-shaped bends 80 proceeding from the end holding means 72, wherein a first arm 82 of each bend 80 of a line 56 continues directly into the end holding means 72 whereas the respectively other arm 84 leads to a connection 86 stationary with respect to the machine frame so that, proceeding from this connection 86 which is stationary with respect to the machine frame and has lines stationary with respect to the machine frame, a connection to a control and supply unit 90 can be provided. The arms 82, 84 thereby extend approximately in the direction of the system axis 54.

The end holding means 66 and 72 as well as the intermediate holding means 76, the support tube 60 and the receiving means 74 for the end holding means 72 represent altogether a system guides means for the long line system section 52 which is designated as a whole as 92.

The support tube 60, as illustrated in FIG. 2, preferably forms at the same time the support tube 60 for stock supply means 94 which are arranged on this tube and are rotatable together with the spindle drum 18, in particular, with the support tube 60. The stock supply means 94 are, for example, supply means for stock bars 96 which are introduced coaxially into the workpiece spindles 30 of the spindle drum 18. In this case, the stock supply means 94 are arranged coaxially to the individual workpiece spindles 30 around the support tube 60 and thus are likewise rotatable about the system axis 54 extending coaxially to the drum axis 20 in the same way as the spindle drum 18.

As illustrated in FIG. 1 and in FIG. 3 on a larger scale, a line system 100 with a long line system section 102 extends, proceeding from the counterspindle drum 22, namely its rear side 98 facing away from the front side 26, coaxially to a system axis 104 with individual lines 106 in the direction of a wall 108 of the machine frame 12 located opposite the rear side 98.

In this respect, the long line system section 102 likewise extends in a support tube 110, and extends between an end 113 held in an end holding means 112 on the side of the counterspindle drum as well as an end 115 held in an end holding means 114 stationary with respect to the machine frame, wherein the end holding means 114 is held on the machine frame 12 so as to be non-displaceable in the direction of the system axis 104 and also non-rotatable about this axis.

On the other hand, the end holding means 112 is displaceable in the support tube 110 in the direction of the system axis 104, and rotatable with the support tube 110, wherein the support tube 110 is non-rotatably connected to the counterspindle 22.

Intermediate holding means 116 are provided, in addition, between the end holding means 112 and 114 and these intermediate holding means are arranged, in the same way as in the case of the support tube 60, so as to be rotatable about the system axis 104 relative to the tube and displaceable in the longitudinal direction of the system axis 104.

The support tube 110, the end holdings means 112 and 114 and the intermediate holding means 116 likewise form a system guide means 92' for the line system section 102.

The long line section 102 can be twisted with the individual lines 106 about the system axis 104, proceeding from a basic position, in the same way as the long line system section 52, wherein an alteration in the length can be compensated by the displaceability of the end holding means 112 in the direction of the system axis 104.

The lines 106 of the line system 100 are, following the end holding means 112, guided out of the support tube 110 via passages 118 therein and form U-shaped bends 120, wherein one arm 122 of each bend 120 abuts on an outer side of the support tube 110 while a second arm 124 of each U-shaped bend 120 abuts on a guide means 126 which is rigidly connected to the counterspindle drum 22 and extends approximately parallel to the system axis 104. The arms 122 and 124 of the U-shaped bends 120 are thus likewise approximately parallel to the system axis 104.

At the end of the arms 124, the lines guided in U-shaped bends 120 are connected to a drive 128 for workpiece spindles 130 in the form of spindle sleeves held in the counterspindle drum 22. The workpiece spindles 130 in the form of spindle sleeves in the counterspindle drum 22 have, for their part, not only a spindle motor and a cocking cylinder for a clamping device 132 thereof but are also held, in addition, in the counterspindle drum 22 so as to be displaceable in the direction of the drum axis 20 so that a so-called Z-axis movement can be carried out with them.

The guidance of the lines 106 of the line system 100 in the form of the bends 120 creates, on the one hand, the possibility of compensating for any longitudinal movement of the end holding means 112 on the side of the counterspindle drum corresponding to a twisting of the long line system section 102, and, on the other hand, the possibility of compensating for the movement of the individual workpiece spindles 130 parallel to the spindle axis insofar as the lines 106 are guided to drives 128 moved with the spindles 130.

In this respect, the bends 120, in which the lines 106 are guided proceeding from the end holding means 112 as far as the drives 128, are preferably located in planes which extend through the system axis 104 which, for its part, extends parallel to the spindle axis 20.

As illustrated, in addition, in FIG. 1, the line system 100 with its long line system section 102 preferably extends along the control and supply unit 90, in particular behind it, wherein for stabilization the support tube 110 is mounted for rotation in a rotary receiving means 134 close to the end holding means 114.

Following the end holding means 114, the individual lines 106 of the line system 110 can then be guided to the control and supply unit whilst arranged to be stationary with respect to the machine frame.

A rotation of the counterspindle drum 22 through a maximum of 180° in directions opposite to one another also leads in the case of the long line system section 102, in the same way as in the case of the line system 50, to a twisting of the long line system section 102 and thus to a slightly helical-like course of the individual lines 106 between the end holding means 112 and 114.

Due to the fact that the end holding means 112 is non-rotatably connected to the counterspindle drum 22, the end of the long line system section 102 accommodated in it rotates through the same rotary angle as the counterspindle drum 22 and so the lines 106 guided in the bends 120 following the end holding means 112 are rotated with the counterspindle drum 22, together with the bends 120.

What is claimed is:

1. A machine tool comprising:
   a machine frame,
   a drum arranged on the machine frame for rotation about
      a drum axis and having a plurality of machining devices for tools held thereon and drives associated with the machining devices and rotatable with the drum, a stationary control and supply unit for the drives, and a line system connected to the drives rotatable with the drum and to the control and supply unit, said line system being free from interruptions and rotary connections and deformable as a result of rotation of the drum, and having a long line system section extending along a system axis and rotatable about the system axis.

2. A machine tool as defined in claim 1, wherein the long line system section is designed to be rotatable exclusively about the system axis.

3. A machine tool as defined in claim 1, wherein the line system section has long lines extending essentially parallel to one another in a non-rotated basic position.

4. A machine tool as defined in claim 1, wherein the line system section is rotatable through a maximum of 180° in opposite directions proceeding from its non-rotated basic position.

5. A machine tool as defined in claim 1, wherein the system axis extends coaxially to the drum axis.

6. A machine tool as defined in claim 1, wherein the long line system section extends in a direction away from a working space.

7. A machine tool as defined in claim 1, wherein the line system section is held extended on a system guide means having a first end holding means rotating with the drum and a second end holding means non-rotatable about the system axis.

8. A machine tool as defined in claim 7, wherein the first and second end holding means are movable relative to one another with respect to their spacing in the direction of the system axis.

9. A machine tool as defined in claim 1, wherein a line section adjoins the long line system section and compensates for any longitudinal movement of its end in the direction of the system axis.

10. A machine tool as defined in claim 9, wherein individual lines of the line section have a bent shape that is variable as a result of the longitudinal movement of the end in the direction of the system axis.

11. A machine tool as defined in claim 10, wherein the bent shape of the lines is a U shape.

12. A machine tool as defined in claim 11, wherein arms of the U shape extend approximately parallel to the system axis.

13. A machine tool as defined in claim 11, wherein the U shape is located in a plane extending through the system axis.

14. A machine tool as defined in claim 7, wherein intermediate holding means are arranged between the first and second end holding means.

15. A machine tool as defined in claim 14, wherein the intermediate holding means are rotatably arranged on a support of the system guide means.

16. A machine tool as defined in claim 15, wherein the support bears at least one of the end holding means and an intermediate holding means.

17. A machine tool as defined in claim 14, wherein the intermediate holding means are mounted on the support so as to be movable in the direction of the system axis and rotatable about this axis.

18. A machine tool as defined in claim 17, wherein the support bears at least one of the end holding means and an intermediate holding means.

19. A machine tool as defined in claim 15, wherein the support is designed as a support tube.

20. A machine tool as defined in claim 15, wherein the support has guide means for stock.

21. A machine tool as defined in claim 20, wherein the support has guide means for the stock arranged coaxially to the individual machining devices.

22. A machine tool as defined in claim 15, wherein the support is non-rotatably connected to the drum.

* * * * *